US008726157B2

(12) United States Patent
Douillet et al.

(10) Patent No.: US 8,726,157 B2
(45) Date of Patent: May 13, 2014

(54) DIGITAL LIVING NETWORK ALLIANCE (DLNA) CLIENT DEVICE WITH THUMBNAIL CREATION

(75) Inventors: Ludovic Douillet, Escondido, CA (US); Nobukazu Sugiyama, San Diego, CA (US); David Tao, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1320 days.

(21) Appl. No.: 12/229,252

(22) Filed: Aug. 21, 2008

(65) Prior Publication Data

US 2010/0050124 A1    Feb. 25, 2010

(51) Int. Cl.
G06F 3/00    (2006.01)
G06F 3/048    (2013.01)

(52) U.S. Cl.
USPC ............. 715/716; 715/838; 725/37; 725/51; 725/52

(58) Field of Classification Search
USPC ............. 715/716, 719, 720, 721, 777, 838; 725/37, 38, 51, 52
See application file for complete search history.

(56) References Cited

U.S. PATENT DOCUMENTS

| 7,640,248 B2 * | 12/2009 | Nakamura | 707/999.001 |
| 2005/0210145 A1 | 9/2005 | Kim et al. | |
| 2006/0064716 A1 | 3/2006 | Sull et al. | |
| 2007/0047909 A1 | 3/2007 | Toyama et al. | |
| 2007/0050837 A1 * | 3/2007 | Lopez-Estrada | 725/138 |
| 2007/0061748 A1 | 3/2007 | Hirose | |
| 2007/0143687 A1 | 6/2007 | Choi et al. | |
| 2007/0150828 A1 * | 6/2007 | Tsukada et al. | 715/777 |
| 2007/0192462 A1 | 8/2007 | Bae et al. | |
| 2007/0238471 A1 | 10/2007 | Bae et al. | |
| 2009/0118017 A1 * | 5/2009 | Perlman et al. | 463/42 |

FOREIGN PATENT DOCUMENTS

WO    WO 2008/023961    2/2008

OTHER PUBLICATIONS

"Sample Application for Intel® Viiv™ Software 1.5" Revision 1.2, Intel, Apr. 2006.
International Search Report and Written Opinion, PCT/US09/54110, Oct. 6, 2009.
Extended European Search Report, corresponding European Application No. 09808688.7, Mar. 21, 2012.

* cited by examiner

*Primary Examiner* — Haoshian Shih
(74) *Attorney, Agent, or Firm* — Miller Patent Services; Jerry A. Miller

(57) ABSTRACT

An item of audio and video (A/V) content is identified stored in association with a DLNA server that does not have a thumbnail image associated with it. The item of A/V content is streamed at a DLNA client device. Intra-coded frames (I-Frames) are selected from the streamed A/V content. The selected I-Frames are presented to a user of the DLNA client device. A selection is received from the user identifying one of the selected I-Frames. The identified I-Frame is stored in association with the item of A/V content. This abstract is not to be considered limiting, since other embodiments may deviate from the features described in this abstract.

17 Claims, 4 Drawing Sheets

DIGITAL LIVING NETWORK ALLIANCE (DLNA) CLIENT DEVICE WITH THUMBNAIL CREATION

BACKGROUND

Audio and video (A/V) content may be stored within a home network and accessed by devices within the home network, such as a Digital Living Network Alliance (DLNA) network, for rendering and viewing. Users of devices within a DLNA home network may browse for A/V content that is available within the home network. Thumbnail images associated with items of A/V content may be displayed for the user to assist with selection of a desired item of A/V content.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
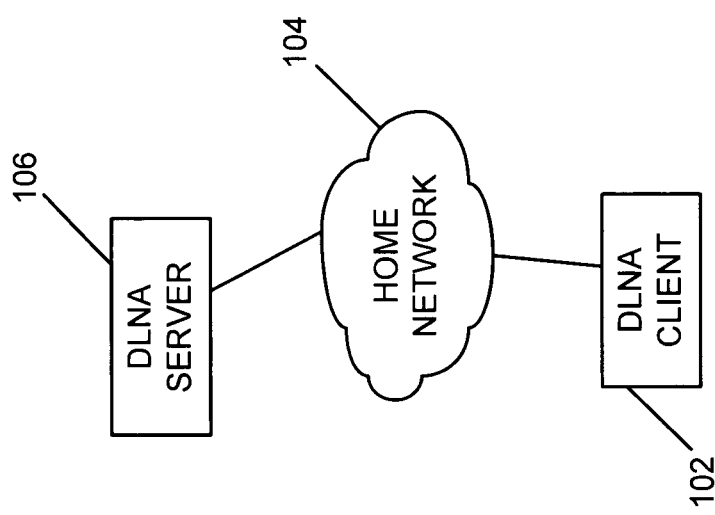
FIG. 1 is a block diagram of an example of an implementation of a system that provides automated thumbnail image and uniform resource identifier (URI) creation for audio and video (A/V) content selection within a home network environment consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system having one or more processors.

Reference throughout this document to "one embodiment," "certain embodiments," an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The present subject matter provides automated thumbnail image creation at a Digital Living Network Alliance (DLNA) client device. The DLNA client identifies audio and video (A/V) content stored within a DLNA server that does not have a thumbnail image associated with it. The DLNA client streams the A/V content at a DLNA client device and selects intra-coded frames (I-Frames) from the streamed A/V content. The DLNA client presents the selected I-Frames to a user of the DLNA client device, receives a selection from the user identifying one of the selected I-Frames, and the identified I-Frame is stored in association with the item of A/V content as a thumbnail image. A uniform resource identifier (URI) is created to provide a link to the stored I-Frame and is stored in association with A/V content information for the A/V content. The stored I-Frame is used as a thumbnail image for selection of the item of A/V content.

Because I-Frames do not depend upon data from previous or later frames, they are useable to create a complete thumbnail image. The I-Frames may be selected in a variety of ways. For example, at least one I-Frame may be selected from each minute of playtime for the streamed A/V content, I-Frames may be selected at random intervals during the playtime, and I-Frames associated with scene changes within the A/V content may be identified and selected. Many other possibilities exist for selection of I-Frames within the scope of the present subject matter.

Turning now to FIG. 1, a block diagram of an example of an implementation of a system 100 is shown that provides automated thumbnail image and uniform resource identifier (URI) creation for audio and video (A/V) content selection within a home network environment. A DLNA client 102 interconnects via a home network 104 with a DLNA server 106. The home network 104 may be any network, such as a DLNA home network. While only one DLNA client 102 and one DLNA server 106 are illustrated within FIG. 1 for ease of illustration, it is understood that many of these devices may be present within any given home network environment. As will be described in more detail below, the DLNA client 102 provides automated thumbnail image creation for A/V content item selections within the home network 104. This automated thumbnail image creation may be performed in response to user queries and may be performed in a scheduled or other deterministic manner. The created thumbnail image is stored in association with the DLNA client 102. The DLNA client 102 also provides automated URI creation to identify the storage location for the created thumbnail image and the URI may be stored in association with the DLNA client 102 along with the created thumbnail image.

A/V content that is accessible by the DLNA client 102 via the home network 104 has A/V content information associated with it. The A/V content information includes identifiers, such as URIs including IP addresses, associated with the items of A/V content. For items of A/V content that have thumbnail images associated with them, URIs are provided for access to the thumbnail images. When an item of A/V content does not have an associated thumbnail image, there is no URI associated with the A/V content information for that item of A/V content. As described above and in more detail below, the DLNA client 102 identifies items of A/V content that do not have thumbnail images associated with them, streams the A/V content to identify suitable images (e.g., I-Frames) to associate with the item of A/V content, presents the suitable images to a user of the DLAN client 102 for selection, and stores a selected image as a thumbnail for the item of A/V content. The DLNA client 102 creates a URI and IP address to the thumbnail image for use within the home network 104 for selection of the item of A/V content. As such, the DLNA client 102 provides automated thumbnail image and URI creation for A/V content selection by devices accessible via the home network 104.

Users of a DLNA client device within the home network 104, such as the DLNA client 102, may access the created thumbnail images during A/V content browsing activities. URIs associated with the thumbnail images by the DLNA client 102 are used to retrieve the thumbnail images for use. A/V content information associated with the A/V content items also includes URIs to the actual items of A/V content. Accordingly, when a user that is browsing for available A/V content selects a created thumbnail image, the A/V content information is examined to identify the URI for the selected item of A/V content. The URI for the selected item of A/V content is accessed to retrieve and render the selected item of A/V content. It is understood that a person of skill in the art can readily formulate appropriate messaging to implement the present subject matter based upon and in consideration of the description herein.

Example devices suitable for use as the DLNA client 102 include a set top box (STB), set back box, television receiver, personal computer (PC), a personal digital assistant (PDA), a mobile phone, or other mobile device (none shown). Alternatively, the retrieved A/V content may be rendered on any other device associated with the home network 104, including the DLNA server 106, without departure from the scope of the present subject matter.

The automated creation of thumbnail images may be performed by the DLNA client 102 in a variety of ways. For example, the DLNA client 102 may reduce response time by creating thumbnail images in advance of user queries for available A/V content. In this example mode of operation, the DLNA client 102 responds to user queries for available A/V content information without further querying A/V content storage devices, such as the DLNA server 106. The DLNA client 102 maintains a list of available A/V content sources and may update the A/V content information associated with those sources in association with an internal startup, scheduled, or other operation or event associated with the DLNA client 102.

Alternatively, the DLNA client 102 may reduce local A/V content information storage resources by creating thumbnail images for A/V content items that do not have thumbnail images in real time in response to user queries for available A/V content. For purposes of the present description, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art. In this second example mode of operation, the DLNA client 102 performs specific queries of each device available via the home network 104 to identify A/V content without associated thumbnail images based upon a user query for available A/V content. As with the previous example, the DLNA client 102 maintains the list of available A/V content sources to facilitate thumbnail creation in response to user queries.

Accordingly, the DLNA client 102 creates thumbnail images for A/V content selection of A/V content that is not provided with thumbnail images when received within the home network 104 for storage. The DLNA client 102 allows users of the DLNA client 102 to select A/V content sources that are available via the home network 104 using thumbnail images created by the DLNA client 102.

Figure 2:
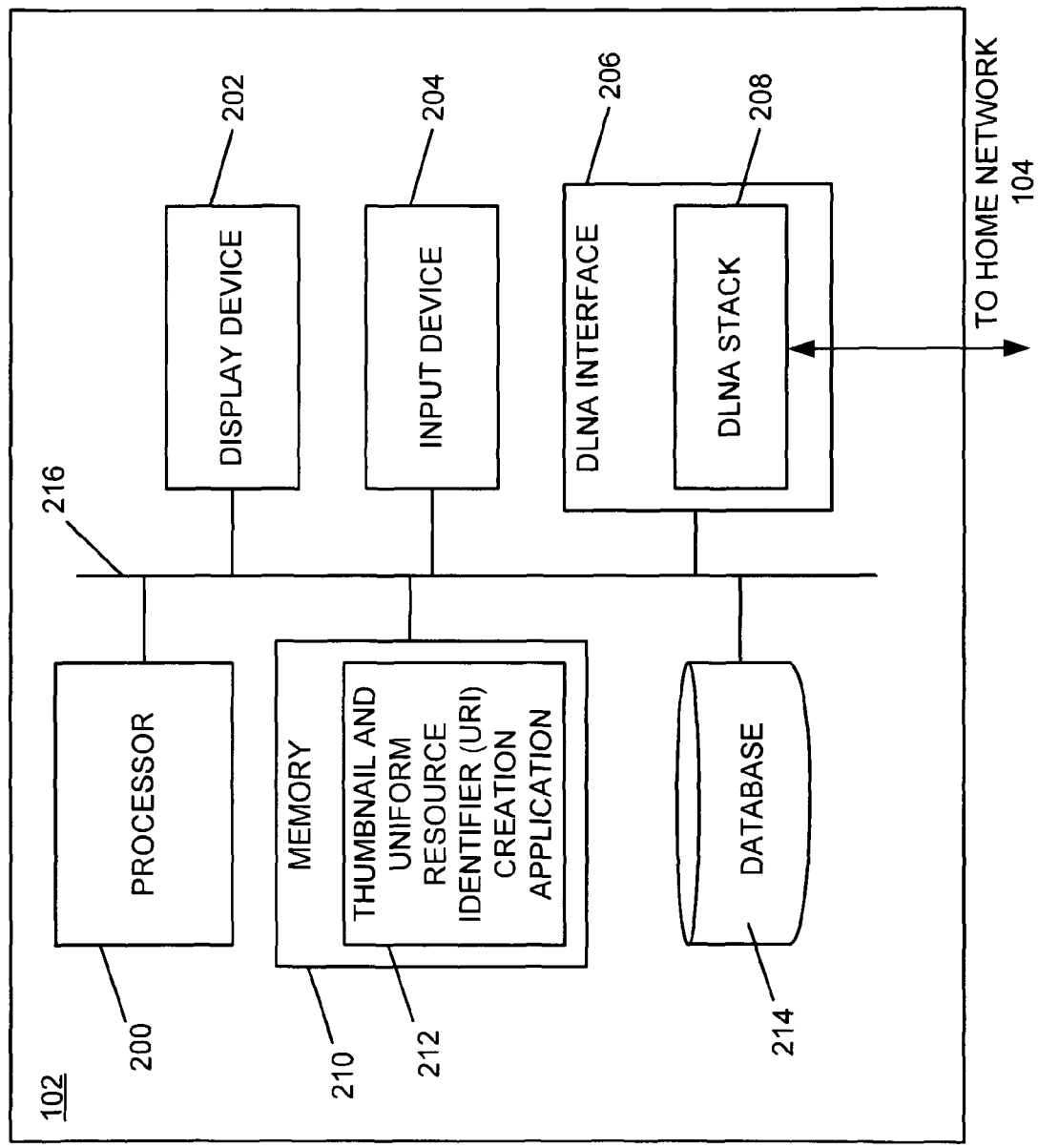
FIG. 2 is a block diagram of an example of an implementation of a DLNA client that provides automated thumbnail and URI creation for A/V content that is not provided with an associated thumbnail image when stored at a server accessible via a home network consistent with certain embodiments of the present invention.

FIG. 2 is a block diagram of an example of an implementation of the DLNA client 102 that provides automated thumbnail and URI creation for A/V content that is not provided with an associated thumbnail image when stored at a server, such as the DLNA server 106, accessible via the home network 104. A processor 200 provides computer instruction execution, computation, and other capabilities within the DLNA client 102. A display device 202 provides visual and/or other information to a user of the DLNA client 102. The display device 202 may include any type of display device, such as a cathode ray tube (CRT), liquid crystal display (LCD), light emitting diode (LED), projection or other display element or panel. An input device 204 provides input capabilities for the user. The input device 204 may include a mouse, pen, trackball, or other input device. One or more input devices, such as the input device 204, may be used.

A DLNA interface module 206 provides communication capabilities for interaction with the DLNA server 106 and other servers accessible via the home network 104. The DLNA interface 206 includes a DLNA stack module 208 that provides the communication protocol interface and management for communication via the home network 104.

It should be noted that the DLNA interface 206 is illustrated with component-level module for ease of illustration and description purposes. It is also understood that the DLNA interface 206 includes any hardware, programmed processor(s), and memory used to carry out the functions of the DLNA interface 206 as described above and in more detail below. For example, the DLNA interface 206 may include additional controller circuitry in the form of application specific integrated circuits (ASICs), processors, and/or discrete integrated circuits and components for performing electrical control activities associated with the DLNA interface 206. Additionally, the DLNA interface 206 also includes interrupt-level, stack-level, and application-level modules as appropriate. Furthermore, the DLNA interface 206 includes any memory components used for storage, execution, and data processing by these modules for performing processing activities associated with the DLNA interface 206. The DLNA interface 206 may also form a portion of other modules described herein without departure from the scope of the present subject matter.

A memory 210 includes a thumbnail and URI creation application 212 that creates thumbnail images and associated URIs as described above and in more detail below. The thumbnail and URI creation application 212 includes instructions executable by the processor 200 for performing these and other functions. The thumbnail and URI creation application 212 may form a portion of an interrupt service routine (ISR), a portion of an operating system, or a portion of a separate application without departure from the scope of the present subject matter. Additionally, any firmware associated with a programmed processor that forms a portion of the DLNA interface 206 may be stored within, executed from, and use data storage space within the DLNA interface 206 or the memory 210 without departure from the scope of the present subject matter.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area suitable for storage of any information and data used in association with thumbnail and URI creation activities and for storage and execution of the thumbnail and URI creation application 212 and any firmware associated with a programmed processor that forms a portion of the DLNA interface 206, as appropriate.

A database 214 stores A/V content information, including created thumbnail images and URIs, created for and associated with A/V content items within the home network 104 that are not provided with thumbnail images from the A/V content producer(s). It is understood that, though the database 214 is illustrated as a separate component, the A/V content information may also be stored within the memory 210 as described above without departure from the scope of the present subject matter.

The processor 200, the display device 202, the input device 204, the DLNA interface 206, the memory 210, and the database 214 are interconnected via one or more interconnections shown as interconnection 216 for ease of illustration. The interconnection 216 may include a system bus, a network, or any other interconnection capable of providing the respective components with suitable interconnection for the respective purpose.

Furthermore, components within the DLNA client 102 may be co-located or distributed within a network without departure from the scope of the present subject matter. For example, the components within the DLNA client 102 may be located within a stand-alone device, such as a personal computer (e.g., desktop or laptop) or handheld device (e.g., cellular telephone, personal digital assistant (PDA), email device, music recording or playback device, etc.). For a distributed arrangement, the display device 202 and the input device 204 may be located at a kiosk, while the processor 200 and memory 210 may be located at a local or remote server. Many other possible arrangements for the components of the DLNA client 102 are possible and all are considered within the scope of the present subject matter.

Figure 3:
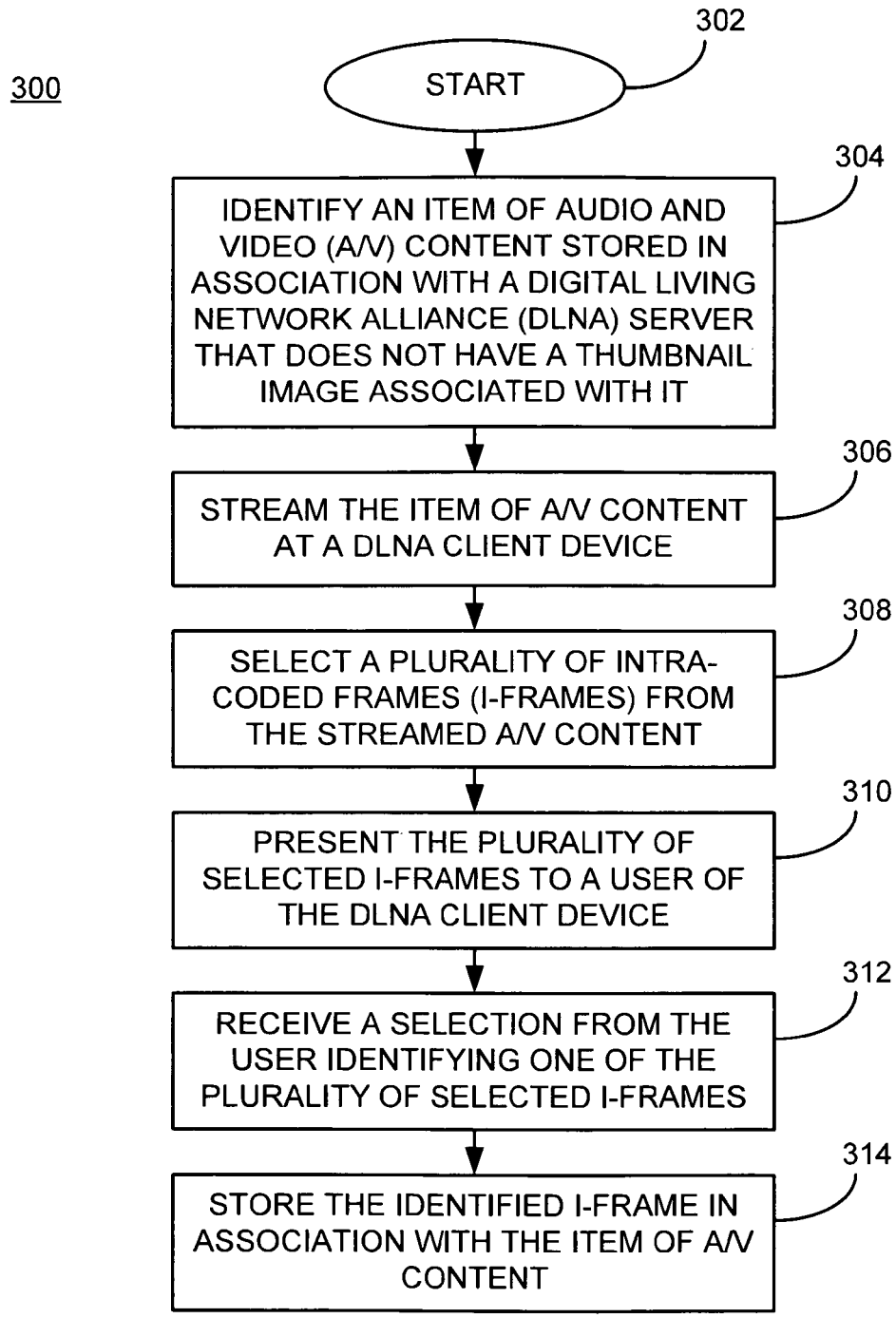
FIG. 3 is a flow chart of an example of an implementation of a process that provides automated thumbnail image creation for audio and video (A/V) content selection within a home network environment consistent with certain embodiments of the present invention.

FIG. 3 is a flow chart of an example of an implementation of a process 300 that provides automated thumbnail image creation for audio and video (A/V) content selection within a home network environment. The process 300 along with the other processes described below may be executed by any client device, such as the DLNA client 102, within the home network 104 to identify A/V content items stored within DLNA servers, such as the DLNA server 106, that do not have an associated thumbnail image usable to select the A/V content items for rendering within the home network 104. The process 300 along with the other processes described below may also form a portion of the thumbnail and URI creation application 212. The process 300 starts at 302. At block 304, the process 300 identifies an item of A/V content stored within a DLNA server that does not have a thumbnail image associated with it. At block 306, the process 300 streams the item of A/V content at a DLNA client device. At block 308, the process 300 selects a plurality of intra-coded frames (I-Frames) from the streamed A/V content. At block 310, the process 300 presents the plurality of selected I-Frames to a user of the DLNA client device. At block 312, the process 300 receives a selection from the user identifying one of the plurality of selected I-Frames. At block 314, the process 300 stores the identified I-Frame in association with the item of A/V content.

Figure 4:
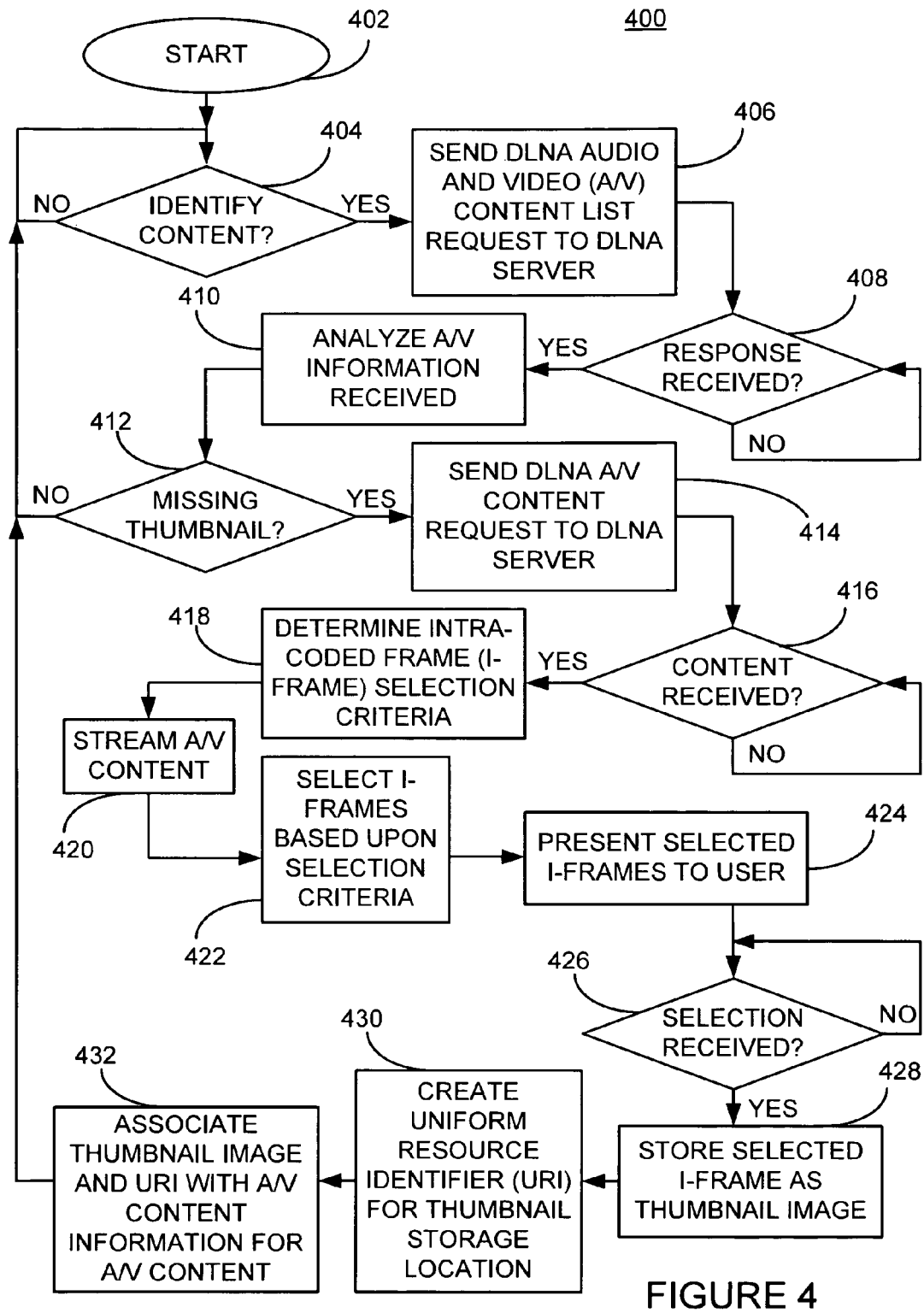
FIG. 4 is a flow chart of an example of an implementation of a process that provides automated thumbnail image and uniform resource identifier (URI) creation for audio and video (A/V) content selection within a home network environment consistent with certain embodiments of the present invention.

FIG. 4 is a flow chart of an example of an implementation of a process 400 that provides automated thumbnail image and uniform resource identifier (URI) creation for audio and video (A/V) content selection within a home network environment. The process 400 starts at 402. At decision point 404, the process 400 makes a determination as to whether an A/V content identification event has occurred. For example, an A/V content identification event may occur during a startup sequence or other event associated with the DLNA client 102. Additionally, an A/V content identification event may occur in response to a user request for A/V content that is available within the home network 104. Many other A/V content identification event triggers are possible and all are considered within the scope of the present subject matter.

When a determination is made that an A/V content identification event has occurred at decision point 404, the process 400 sends a DLNA A/V content list request to a DLNA server, such as the DLNA server 106, at block 406. It is understood that a person of skill in the art can readily formulate appropriate messaging to implement the present subject matter based upon and in consideration of the description herein. Furthermore, while the process 400 is illustrated as sending the DLNA A/V content list request to a single DLNA server for ease of illustration purposes, it is understood that the process may be modified to send DLNA A/V content list requests to multiple DLNA servers. Accordingly, all such modifications are considered within the scope of the present subject matter.

The process 400 waits at decision point 408 for a response to the DLNA A/V content list request including an A/V content list to be received. It should be noted that time out procedures and other error control procedures are not illustrated within the example process 400 for ease of illustration purposes. However, it is understood that all such procedures are considered to be within the scope of the present subject matter for the example process 400.

When a determination is made that the response to the A/V content list request has been received, the process 400 analyzes the received A/V content information at block 410. At decision point 412, the process 400 makes a determination as to whether a thumbnail image is missing from any item of the received A/V content information. For example, the process 400 may analyze the received A/V content list to identify each item of A/V content represented within the content list, determine whether or not each item has a URI associated with a thumbnail image in addition to a URI associated with the actual item of A/V content, and identify any items of A/V content information that do not have an associated URI for a thumbnail image. This may be performed by parsing the A/V content list for URIs associated with thumbnail images, partitioning the A/V content list into its constituent A/V content elements and searching each constituent element for URIs associated with thumbnail images, or by any other approach useable to identify that an item of A/V content information does not have a thumbnail image associated with it.

When a determination is made at decision point 412 that no thumbnail image(s) are missing from the received A/V content information, the process 400 returns to decision point 404 to await a new A/V content identification event as described above. It is understood that additional processing may be performed to retrieve thumbnail images or items of A/V content for selection and rendering of A/V content items, respectively, and that this additional processing is not depicted within FIG. 4 for ease of illustration purposes.

When a determination is made at decision point 412 that a one or more thumbnail image are missing from any of the received A/V content information, the process 400 sends a DLNA content request to the DLNA server 106 at block 414. As described above, it is understood that a person of skill in the art can readily formulate appropriate messaging to implement the present subject matter based upon and in consideration of the description herein. It is also understood that if multiple items of A/V content are determined to be missing thumbnail images, multiple DLNA content requests may be generated and that multiple A/V content items may be received, as described in more detail below for a single A/V content item.

At decision point 416, the process 400 waits for the requested item of A/V content to be received. When a determination is made that the requested item of A/V content has been received, the process 400 determines any I-Frame selection criteria at block 418. Examples of I-Frame selection criteria include criteria for selecting at least one I-Frame from each minute of playtime of the streamed A/V content, selecting I-Frames at random intervals during playtime of the streamed A/V content, selecting at least one I-Frame for each scene change associated with the A/V content. Many other I-Frame selection criteria are possible and all are considered within the scope of the present subject matter. The I-Frame selection criteria may be retrieved from the database 214 or the memory 210, depending upon where the I-Frame selection criteria are stored.

At block 420, the process 400 streams the received item of A/V content. Streaming the received item of A/V content includes, for purposes of the present description, rendering the A/V content by playing the A/V content either at a normal rate or at a reduced or increased rate, loading each frame of the A/V content into a data area of the memory 210, and stepping through each frame of the A/V content at a video processing interface (not shown). Streaming also includes any other approach to progressively moving through frames associated with the received item of A/V content to enable analysis of the content of the frames.

At block 422, the process 400 selects I-Frames based upon the I-Frame selection criteria. At block 424, the process 400 presents the selected I-Frames to a user of the DLNA client 102 via the display device 202 in any convenient format, such as via a graphical user interface (GUI). For example, the I-Frames may be presented as a non-hierarchical pool of images on the display device 202. The user may browse the selected I-Frames and identify an I-Frame that is meaningful to the user to associate with the item of A/V content as a thumbnail image.

The process 400 waits at decision point 426 for the user's selection to be received. When a determination is made at decision point 426 that the user has made a selection, the process 400 stores the selected I-Frame as a thumbnail image for the item of A/V content at block 428. For example, the I-Frame may be stored in the database 214 or the memory 210. At block 430, the process 400 creates a URI for the storage location of the thumbnail image. The process 400 associates the thumbnail image and the URI with the A/V content information for the A/V content at block 432. For example, the process 400 may associate the thumbnail image and the URI with the A/V content by updating the received A/V content information with the URI for the storage location of the thumbnail image.

The updated A/V content information may be stored locally for later use. Additionally, the updated A/V content information may be sent to the DLNA server 106 so that future processing may identify the storage location of the created thumbnail image using the URI created by the process 400. Many other storage and A/V content information update procedures are possible and all are considered within the scope of the present subject matter. After the thumbnail image and URI are associated with the A/V content information, the process 400 returns to decision point 404 and continues processing as described above.

Accordingly, the process 400 provides automated thumbnail image and URI creation for A/V content that does not have a thumbnail image associated with it. The process 400 streams the A/V content, selects I-Frames based upon I-Frame selection criteria, and presents the selected I-Frames to a user of the DLNA client 102. Further, the process 400 allows a user of the DLNA client 102 to select created I-Frames to associate with A/V content within a home network environment.

Based upon the foregoing description, the present subject matter provides automated thumbnail image creation at a Digital Living Network Alliance (DLNA) client device. The DLNA client identifies audio and video (A/V) content stored within a DLNA server that does not have a thumbnail image associated with it. The DLNA client streams the A/V content at a DLNA client device and selects intra-coded frames (I-Frames) from the streamed A/V content. The DLNA client presents the selected I-Frames to a user of the DLNA client device, receives a selection from the user identifying one of the selected I-Frames, and the identified I-Frame is stored in association with the item of A/V content as a thumbnail image. A uniform resource identifier (URI) is created to provide a link to the stored I-Frame and is stored in association with A/V content information for the A/V content. The stored I-Frame is used as a thumbnail image for selection of the item of A/V content.

So, in accord with the above description, an item of audio and video (A/V) content is identified stored in association with a DLNA server that does not have a thumbnail image associated with it. The item of A/V content is streamed at a DLNA client device. A plurality of intra-coded frames (I-Frames) are selected from the streamed A/V content. The plurality of selected I-Frames are presented to a user of the DLNA client device. A selection is received from the user identifying one of the plurality of selected I-Frames. The identified I-Frame is stored in association with the item of A/V content.

Thus, in accord with certain implementations, a method of allowing a user of a Digital Living Network Alliance (DLNA) client device to choose a thumbnail image to associate with content stored within a home network involves identifying an item of audio and video (A/V) content stored in association with a DLNA server that does not have a thumbnail image associated with it; streaming the item of A/V content at a DLNA client device; selecting a plurality of intra-coded frames (I-Frames) from the streamed A/V content; presenting the plurality of selected I-Frames to a user of the DLNA client device; receiving a selection from the user identifying one of the plurality of selected I-Frames; and storing the identified I-Frame in association with the item of A/V content.

In certain implementations, the method of allowing a user of a Digital Living Network Alliance (DLNA) client device to choose a thumbnail image to associate with content stored within a home network further involves browsing available A/V content items stored within the DLNA server; analyzing A/V content information associated with the available A/V content items; and determining that an item of A/V content information associated with the item of A/V content does not have a uniform resource identifier (URI) identifying a thumbnail image associated with the item of A/V content. In certain implementations, the method further involves requesting the item of A/V content from the DLNA server; receiving the item of A/V content; and searching for available I-frames within the A/V content. In certain implementations, the method further involves selecting at least one I-Frame from each minute of playtime of the streamed A/V content. In certain implementations, the method further involves selecting I-Frames at random intervals during playtime of the streamed A/V content. In certain implementations, the method further involves identifying scene changes associated with the streamed A/V content and selecting at least one I-Frame for each of the scene changes. In certain implementations, the method further involves presenting the plurality of selected I-Frames within a non-hierarchical pool on a display associated with the DLNA client. In certain implementations, the method further involves storing the identified I-Frame as a thumbnail image at the DLNA client. In certain implementations, the method further involves creating a thumbnail uniform resource identifier (URI) that links to the stored I-Frame; and storing the thumbnail URI in association with A/V content information representing the associated item of A/V content. In certain implementations, the method further involves presenting the stored I-Frame in association with the thumbnail URI to the user as part of an A/V content browsing activity of the user; receiving a selection associated with the thumbnail URI; retrieving a content URI that links to the associated item of A/V content from the A/V content information; retrieving the associated item of A/V content from the DLNA server using the content URI; and rendering the associated item of A/V content for viewing by the user.

A Digital Living Network Alliance (DLNA) audio and video (A/V) client device for allowing a user to choose a thumbnail image to associate with content stored within a home network consistent with certain implementations has a memory adapted to store representations of A/V content distributed within a home network environment and a display device for displaying information. A processor is programmed to identify an item of audio and video (A/V) content stored in association with a DLNA server that does not have a thumbnail image associated with it; stream the item of A/V content at a DLNA client device; select a plurality of intra-coded frames (I-Frames) from the streamed A/V content; present the plurality of selected I-Frames to a user of the DLNA client device on the display; receive a selection from the user identifying one of the plurality of selected I-Frames; and store the identified I-Frame in association with the item of A/V content to the memory.

In certain implementations, the processor is further programmed to browse available A/V content items stored within the DLNA server; analyze A/V content information associated with the available A/V content items; and determine that an item of A/V content information associated with the item of A/V content does not have a uniform resource identifier (URI) identifying a thumbnail image associated with the item of A/V content. In certain implementations, the processor is further programmed to request the item of A/V content from the DLNA server; receive the item of A/V content; and search for available I-frames within the A/V content. In certain implementations, the processor is further programmed to select at least one I-Frame from each minute of playtime of the streamed A/V content. In certain implementations, the processor is further programmed to select I-Frames at random intervals during playtime of the streamed A/V content. In certain implementations, the processor is further programmed to identify scene changes associated with the streamed A/V content to select at least one I-Frame for each of the scene changes. In certain implementations, the processor is further programmed to present the plurality of selected I-Frames within a non-hierarchical pool on the display. In certain implementations, the processor is further programmed to store the identified I-Frame as a thumbnail image to the memory. In certain implementations, the processor is further programmed to create a thumbnail uniform resource identifier (URI) that links to the stored I-Frame; and store the thumbnail URI in association with A/V content information representing the associated item of A/V content in the memory. In certain implementations, the processor is further programmed to present the stored I-Frame in association with the thumbnail URI to the user as part of an A/V content browsing activity of the user; receive a selection associated with the thumbnail URI; retrieve a content URI that links to the associated item of A/V content from the A/V content information; retrieve the associated item of A/V content from the DLNA server using the content URI; and render the associated item of A/V content on the display for viewing by the user.

A Digital Living Network Alliance (DLNA) audio and video (A/V) client device for allowing a user to choose a thumbnail image to associate with content stored within a home network consistent with certain implementations has a memory adapted to store representations of A/V content distributed within a home network environment and a display device for displaying information. A processor is programmed to browse available A/V content items stored within a DLNA server; analyze A/V content information associated with the available A/V content items; determine that an item of A/V content information associated with an item of A/V content does not have a uniform resource identifier (URI) identifying a thumbnail image associated with the item of A/V content; request the item of A/V content from the DLNA server; receive the item of A/V content from the DLNA server; stream the item of A/V content; search for available I-frames within the A/V content; select a plurality of intra-coded frames (I-Frames) from the streamed A/V content; present the plurality of selected I-Frames to a user of the DLNA client device on the display; receive a selection from the user identifying one of the plurality of selected I-Frames; and store the identified I-Frame in association with the item of A/V content to the memory.

While certain embodiments herein were described in conjunction with specific circuitry that carries out the functions described, other embodiments are contemplated in which the circuit functions are carried out using equivalent executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of allowing a user of a Digital Living Network Alliance (DLNA) client device to choose a thumbnail image to associate with an item of content stored within a home network, comprising:
   identifying an item of audio and video (A/V) content stored in association with a DLNA server that does not have an associated thumbnail image, where identifying the item of A/V content stored in association with a DLNA server that does not have an associated thumbnail image comprises: browsing available A/V content items stored within the DLNA server, analyzing A/V content information associated with the available A/V content items; where presence or absence of a thumbnail image associated with the item of A/V content is determined by presence or absence of a uniform resource identifier (URI) in the A/V content information; and determining that an item of A/V content information associated with the item of A/V content does not have a uniform resource identifier identifying a thumbnail image associated with the item of A/V content in order to determine that the A/V content does not have an associated thumbnail image;
   streaming the item of A/V content at a DLNA client device;
   detecting scenes in the item of A/V content;
   selecting a plurality of intra-coded frames (I-Frames) from the streamed A/V content, where at least one I-Frame is selected for each detected scene of the item of A/V content;
   presenting the plurality of selected I-Frames to a user of the DLNA client device;
   receiving a selection from the user identifying one of the plurality of selected I-Frames; and
   storing the identified I-Frame in association with the item of A/V content as an identifier of the item of A/V content.

2. The method according to claim 1, where streaming the A/V content at the DLNA client device further comprises:
   requesting the item of A/V content from the DLNA server;
   receiving the item of A/V content; and
   searching for I-frames within the A/V content.

3. The method according to claim 1, where selecting a plurality of I-Frames from the streamed A/V content further comprises selecting at least one I-Frame from each minute of playtime of the streamed A/V content.

4. The method according to claim 1, where selecting a plurality of I-Frames from the streamed A/V content further comprises selecting I-Frames at random intervals during playtime of the streamed A/V content.

5. The method according to claim 1, where presenting the plurality of selected I-Frames to a user of the DLNA client device further comprises presenting the plurality of selected I-Frames within a non-hierarchical pool on a display associated with the DLNA client.

6. The method according to claim 1, where storing the identified I-Frame in association with the item of A/V content further comprises storing the identified I-Frame as a thumbnail image at the DLNA client.

7. The method according to claim 1, further comprising:
   creating a thumbnail uniform resource identifier (URI) that links to the stored I-Frame; and
   storing the thumbnail URI in association with A/V content information representing the associated item of A/V content.

8. The method according to claim 7, further comprising:
   presenting the stored I-Frame in association with the thumbnail URI to the user as part of an A/V content browsing activity of the user;
   receiving a selection associated with the thumbnail URI;
   retrieving a content URI that links to the associated item of A/V content from the A/V content information;
   retrieving the associated item of A/V content from the DLNA server using the content URI; and
   rendering the associated item of A/V content for viewing by the user.

9. A Digital Living Network Alliance (DLNA) audio and video (A/V) client device for allowing a user to choose a thumbnail image to associate with an item of content stored within a home network, comprising:
   a memory adapted to store representations of A/V content distributed within a home network environment; and
   a processor programmed to:
   identify an item of audio and video (A/V) content stored in association with a DLNA server that does not have an associated thumbnail image by browsing available A/V content items stored within the DLNA server, analyzing A/V content information associated with the available A/V content items; where presence or absence of a thumbnail image associated with the item of A/V content is determined by presence or absence of a uniform resource identifier (URI) in the A/V content information; and
   determine that an item of A/V content information associated with the item of A/V content does not have a uniform resource identifier identifying a thumbnail image associated with the item of A/V content in order to determine that the A/V content does not have an associated thumbnail image;
   stream the item of A/V content at a DLNA client device;
   detect scenes in the item of A/V content;

select a plurality of intra-coded frames (I-Frames) from the streamed A/V content, where at least one I-Frame is selected for each detected scene of the item of A/V content;

present the plurality of selected I-Frames to a user of the DLNA client device on a display;

receive a selection from the user identifying one of the plurality of selected I-Frames; and store the identified I-Frame in association with the item of A/V content as an identifier of the item of A/V content to the memory.

10. The device according to claim 9, where the processor is further programmed to:

request the item of A/V content from the DLNA server;

receive the item of A/V content; and search for available I-frames within the A/V content.

11. The device according to claim 9, where the processor is further programmed to select at least one I-Frame from each minute of playtime of the streamed A/V content.

12. The device according to claim 9, where the processor is further programmed to select I-Frames at random intervals during playtime of the streamed A/V content.

13. The device according to claim 9, where the processor is further programmed to present the plurality of selected I-Frames within a non-hierarchical pool on the display.

14. The device according to claim 9, where the processor is further programmed to store the identified I-Frame as a thumbnail image to the memory.

15. The device according to claim 9, where the processor is further programmed to:

create a thumbnail uniform resource identifier (URI) that links to the stored I-Frame; and store the thumbnail URI in association with A/V content information representing the associated item of A/V content in the memory.

16. The device according to claim 15, where the processor is further programmed to:

present the stored I-Frame in association with the thumbnail URI to the user as part of an A/V content browsing activity of the user;

receive a selection associated with the thumbnail URI;

retrieve a content URI that links to the associated item of A/V content from the A/V content information;

retrieve the associated item of A/V content from the DLNA server using the content URI; and render the associated item of A/V content on the display for viewing by the user.

17. A Digital Living Network Alliance (DLNA) audio and video (A/V) client device for allowing a user to choose a thumbnail image to associate with an item of content stored within a home network, comprising:

a memory adapted to store representations of A/V content distributed within a home network environment;

a display device for displaying information; and a processor programmed to:

browse available A/V content items stored within a DLNA server;

analyze A/V content information associated with the available A/V content items;

determine that an item of A/V content information associated with an item of A/V content does not have a uniform resource identifier (URI) identifying a thumbnail image associated with the item of A/V content;

request the item of A/V content from the DLNA server;

receive the item of A/V content from the DLNA server;

stream the item of A/V content;

detect scenes in the item of A/V content;

search for available I-frames within each of the detected scenes in the item of A/V content;

select a plurality of intra-coded frames (I-Frames) from the streamed A/V content, where at least one I-Frame is selected for each scene of the item of A/V content;

present the plurality of selected I-Frames to a user of the DLNA client device on the display;

receive a selection from the user identifying one of the plurality of selected I-Frames; and store the identified I-Frame in association with the item of A/V content as an identifier of the item of A/V content to the memory.

* * * * *